United States Patent
Meehan et al.

(10) Patent No.: US 8,889,289 B2
(45) Date of Patent: Nov. 18, 2014

(54) FIXTURE FOR HOLDING TERMINALS OF A BATTERY IN ALIGNMENT

(75) Inventors: Patrick J. Meehan, Ann Arbor, MI (US); Stuart D. Barter, Lima, NY (US); Robert J. Scheuerman, Washington, MI (US); Rick F. Rourke, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1225 days.

(21) Appl. No.: 12/472,455

(22) Filed: May 27, 2009

(65) Prior Publication Data

US 2010/0304195 A1 Dec. 2, 2010

(51) Int. Cl.
| | |
|---|---|
| *B25B 1/20* | (2006.01) |
| *H01M 2/00* | (2006.01) |
| *H01M 2/10* | (2006.01) |
| *H01M 2/26* | (2006.01) |
| *H01M 2/34* | (2006.01) |

(52) U.S. Cl.
CPC ............ *H01M 2/1077* (2013.01); *H01M 2/266* (2013.01); *H01M 2/34* (2013.01); *B25B 1/20* (2013.01); *Y02E 60/12* (2013.01)

USPC .............................................. 429/209; 269/37

(58) Field of Classification Search
USPC ............................... 132/142–143; 269/37–45
See application file for complete search history.

(56) References Cited

U.S. PATENT DOCUMENTS

| 1,396,162 | A | * | 11/1921 | Campbell et al. ................ 269/37 |
| 2,406,490 | A | * | 8/1946 | Day ............................... 132/118 |
| 5,449,007 | A | | 9/1995 | Arnhols |
| 2004/0250831 | A1 | * | 12/2004 | Rizzuto ......................... 132/271 |

* cited by examiner

*Primary Examiner* — Maria J Laios
(74) *Attorney, Agent, or Firm* — Quinn Law Group, PLLC

(57) ABSTRACT

A fixture is configured for holding terminals of a battery in alignment. The fixture includes a first and a second side member. The first and second side members each include a plurality of first and second teeth, respectively. The second side member is movable relative to the first side member between an open position and a closed position. The second side member opposes the first side member such that a number of the first teeth oppose a corresponding number of the second teeth and a slit is defined between each of the adjacent teeth when the fixture is in the open position. Likewise, the second side member opposes the first side member such that the number of the first teeth are staggered from the corresponding number of the second teeth to reduce the slit in size when the fixture is in the closed position.

12 Claims, 4 Drawing Sheets

FIXTURE FOR HOLDING TERMINALS OF A BATTERY IN ALIGNMENT

TECHNICAL FIELD

The present invention relates to a fixture for holding terminals of a battery in alignment.

BACKGROUND OF THE INVENTION

Terminals on some batteries are formed from very thin, foil-like material. Typically, a plurality of the terminals extend from the battery in close proximity to one another. When electrically interconnecting these terminals with an interconnect board, the terminals tend to be bent and otherwise damaged very easily.

SUMMARY OF THE INVENTION

A fixture is configured for holding terminals of a battery in alignment. The fixture includes a first side member and a second side member. The first side member includes a plurality of first teeth that extend in spaced and generally parallel relationship to one another. The second side member includes a plurality of second teeth that extend in spaced and generally parallel relationship to one another. The second side member is movable relative to the first side member between an open position and a closed position. The second side member opposes the first side member such that a number of the plurality of first teeth oppose a corresponding number of the plurality of second teeth and a slit is defined between each of the adjacent teeth when the fixture is in the open position. Likewise, the second side member opposes the first side member such that the number of the first teeth are staggered from the corresponding number of the plurality of second teeth to reduce the slit in size and capture the terminals of the battery therebetween when the fixture is in the closed position.

In another aspect of the invention, a fixture is configured for holding terminals of a battery in alignment. The fixture includes a first side member, a second side member, a first handle portion, and a second handle portion. The first side member includes a plurality of first teeth that extend in spaced and generally parallel relationship to one another. The second side member includes a plurality of second teeth that extends in spaced and generally parallel relationship to one another. The first handle portion extends from the first side member and the second handle portion extends from the second side portion. The second handle portion is movable relative to the first handle portion to move the second side member relative to the first side member between an open position and a closed position. The second side member opposes the first side member such that a number of the plurality of first teeth oppose a corresponding number of the plurality of second teeth and a slit is defined between each of the adjacent teeth when the fixture is in the open position. The second side member opposes the first side member such that the number of the first teeth are staggered relative to the corresponding number of the plurality of second teeth to reduce the slit in size and capture the terminals of the battery therebetween when the fixture is in the closed position.

In yet another aspect of the invention, a fixture is configured for holding terminals of a battery in alignment. The fixture includes a first side member, a second side member, a first handle portion, and a second handle portion. The first side member includes a plurality of first teeth that extend in spaced and generally parallel relationship to one another. The second side member includes a plurality of second teeth that extend in spaced and generally parallel relationship to one another. The first handle portion extends from the first side member and the second handle portion extends from the second side portion. The second handle portion is movable relative to the first handle portion to move the second side member with the plurality of second teeth relative to the first side member and the first teeth between an open position and a closed position.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
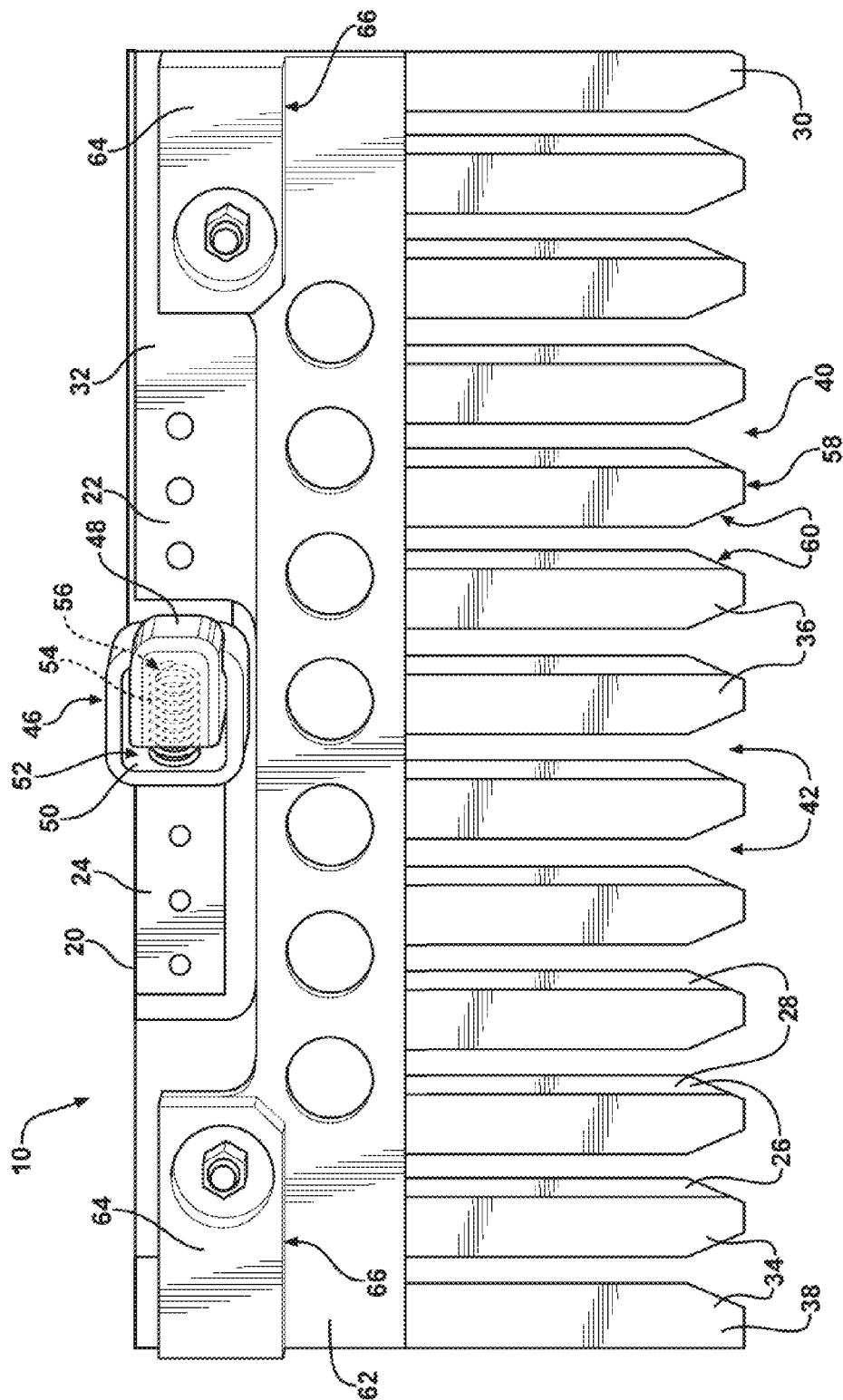
FIG. 1 is a schematic bottom perspective view of a fixture configured for holding a plurality of spaced terminals of a battery in alignment.
Figure 2:
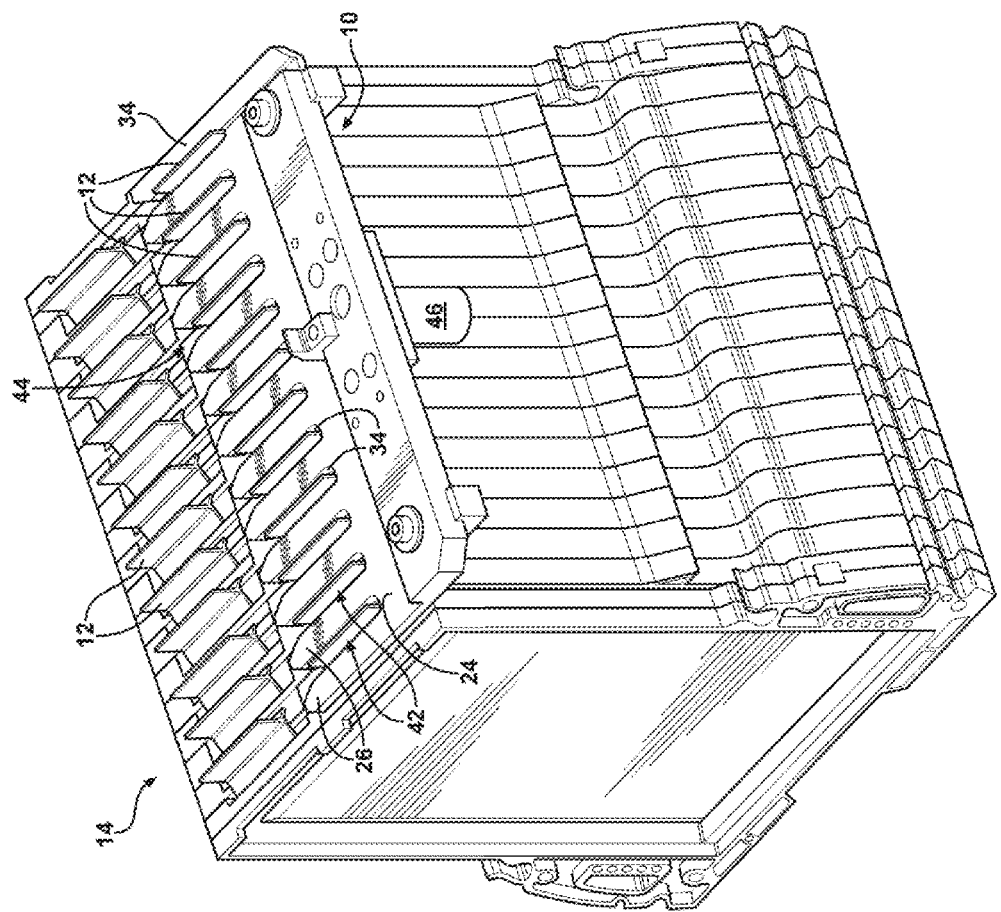
FIG. 2 is a schematic top perspective view of the fixture holding a plurality of the spaced terminals of the battery in alignment.
Figure 3:
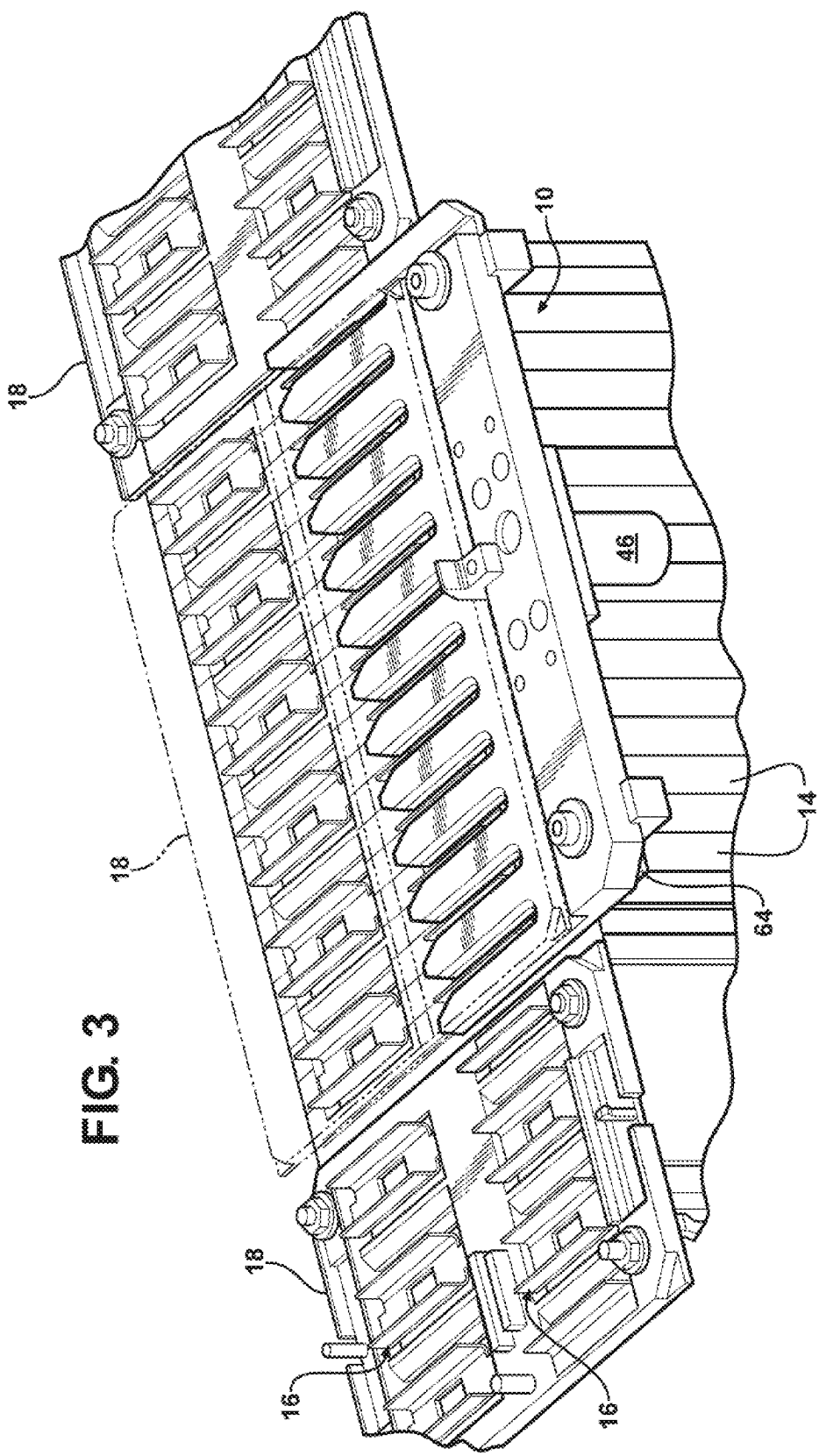
FIG. 3 is a partial schematic top perspective view of the fixture holding a plurality of the spaced terminals of the battery in alignment with the terminals threaded into slots of an interconnect board.
Figure 4:
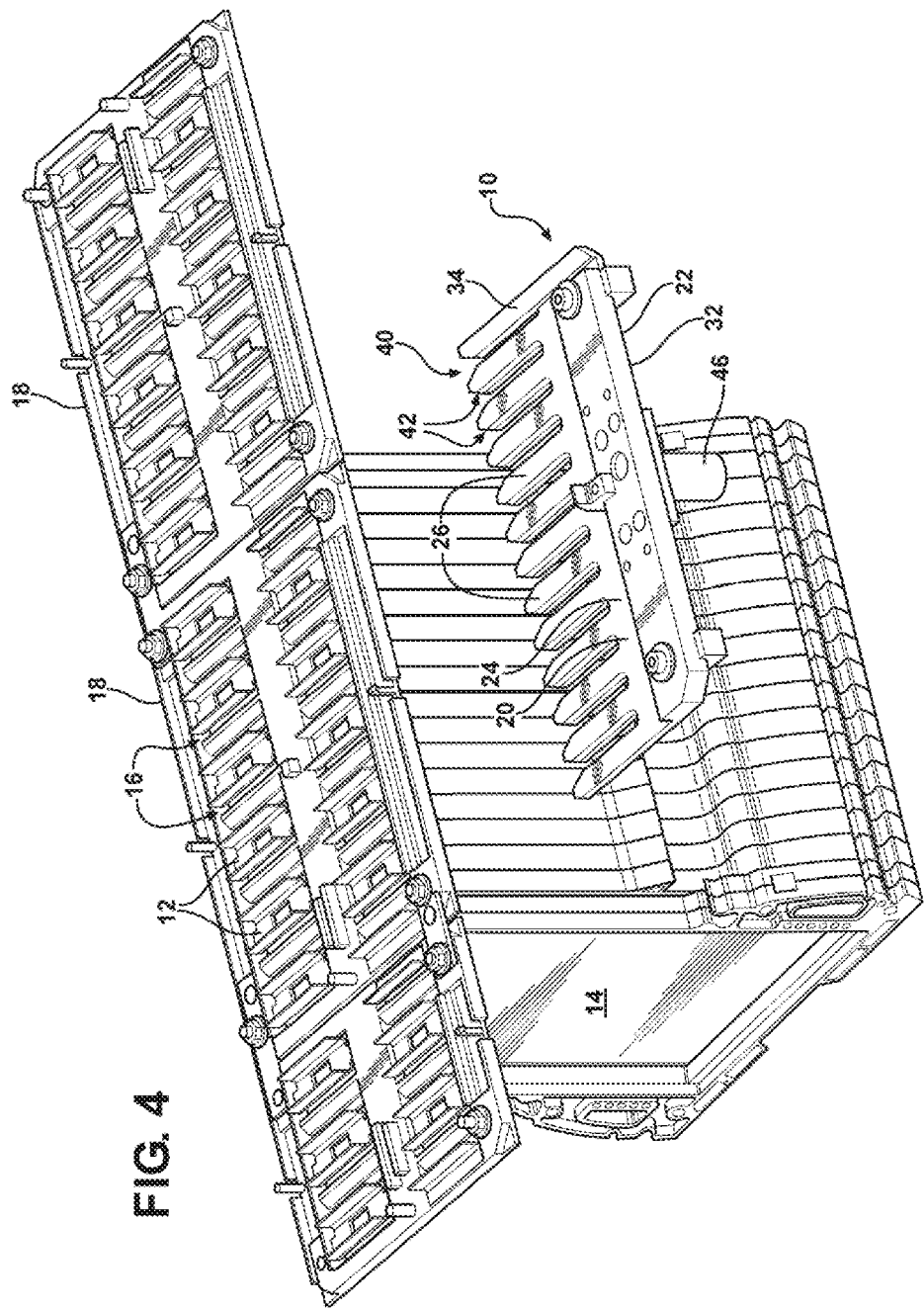
FIG. 4 is a schematic top perspective view of the terminals inserted into the slots of the interconnect board and the fixture remove.

Referring to the drawings, wherein like reference numbers refer to like components, FIG. 1 shows a fixture 10 that is configured to hold a plurality of spaced terminals 12 of a battery 14 in alignment, as further shown in FIGS. 2-4. Referring to FIGS. 2 and 3, once the terminals 12 are held in alignment, the terminals 12 are threaded into respective slots 16 defined in an interconnect board 18.

The fixture 10 includes a first side member 20 and a second side member 22 opposing the first side member 20. The first side member 20 is movably mounted relative to the second side member 22. The first side member 20 includes a first base 24 and a plurality first teeth 26 extending from the first base 24 in spaced and generally parallel relationship to one another. The first teeth 26 include a plurality of first intermediate teeth 28 disposed between a pair of first end teeth 30. The second side member 22 includes a second base 32 and a plurality of second teeth 34 extending from the second base 32 in spaced and generally parallel relationship to one another. The second teeth 34 include a plurality of second intermediate teeth 36 disposed between a pair of second end teeth 38. In the embodiment shown in FIGS. 1-4, the total number of first teeth 26 equals the total number of second teeth 34. It should be appreciated, however, that the total number of the first teeth 26 and the second teeth 34 may vary as known to those skilled in the art.

The first and second side members 20, 22 are disposed such that the first base 24 opposes the second base 32 and a number of the first teeth 26 opposes a corresponding number of second teeth 34. More specifically, referring to FIG. 1, the fixture 10 is shown in an open position 40 and each of the first teeth 26 are offset by one tooth, relative to the second teeth 34.

Therefore, one of the first end teeth 30 does not oppose any of the second teeth 34 while the other of the first end teeth 30 opposes one of the second intermediate teeth 36. Likewise, one of the second teeth 34 does not oppose any of the first teeth 26 while the other of the second end teeth 38 opposes one of the first intermediate teeth 28.

Referring again to FIGS. 1 and 4, when the fixture 10 is in the open position 40, a slit 42 is defined between the first and/or second teeth 34 and the adjacent first and/or second teeth 34. When the first side member 20 is moved relative to the second side member 22, as shown in FIG. 2, the fixture 10 moves to a closed position 44 such that the first teeth 26 move relative to the second teeth 34 and the first teeth 26 and the corresponding number of the second teeth 34 are staggered relative to one another to reduce size of the slit 42.

The fixture 10 may be maneuvered when in the open position 40 such that the terminals 12 of the battery 14 are disposed within a respective one of the slits 42. When the first side member 20 is moved relative to the second side member 22 and the terminals 12 are still disposed in the slits 42, the first teeth 26 move relative to the second teeth 34 such that the slits 42 close in size. As a result, the terminals 12 are captured between the first and second teeth 26, 34 to hold the terminals 12 in the desired alignment. Referring specifically to FIG. 2, with the fixture 10 in the closed position 44 and the terminals 12 held in alignment, the interconnect board 18 is maneuvered over the battery 14 and moved toward the battery 14 and the terminals 12 such that the terminals 12 are threaded into the respective slots 16 within the interconnect board 18. Once the interconnect board 18 is in place with the terminals 12 extending into the respective slots 16, the fixture 10 is disposed between the battery 14 and the interconnect board 18. The fixture 10 is then moved to the open position 40 such that the slits 42 open and the terminals 12 are released from the teeth 26, 34. Referring to FIG. 4, once the fixture 10 is in the open position 40, the fixture 10 is moved away from the battery 14 and the terminals 12. As the fixture 10 is removed from the battery 14 and the terminals 12, the interconnect board 18 moves closer to the battery 14 and the terminals 12 slide the remainder of the way through the respective slots 16 without being damaged or otherwise bent by the interconnect board 18.

To maneuver the fixture 10 into place and also move the fixture 10 between the open and closed positions 40, 44, a handle 46 may extend from the first and second side members 20, 22, as shown best in FIG. 1. The handle 46 may extend generally perpendicularly from the first and second side members 20, 22. It should be appreciated, however, that the handle 46 may also extend from the first and second side members 20, 22 in any other suitable direction known to those skilled in the art. The handle 46 includes a first handle portion 48 that is movable relative to a second handle portion 50. The first handle portion 48 extends from the first side member 20 and the second handle portion 50 extends from the second side member 22. The handle 46 is configured to be grasped and manipulated by one hand of a user. The first handle portion 48 forms a generally C-shaped cross-section that defines a cavity 52 that is configured for receiving at least a portion of the second handle portion 50.

A biasing device 54 may be disposed to react between the first side member 20 and the second side member 22. Referring to FIG. 1, the biasing device 54 is a coil spring. It should be appreciated that the biasing device 54 is not limited to being a coil spring as any other spring or device configured for biasing the first side member 20 relative to the second side member 22 may be used as known to those skilled in the art. Referring to FIG. 1, the biasing device 54 reacts between the first side member 20 and the second side member 22 to urge the first side member 20 relative to the second side member 22 and into the open position 40, as shown in FIGS. 1 and 4.

More specifically, referring to FIG. 1, the biasing device 54 is disposed between the first handle portion 48 and the second handle portion 50. The second handle portion 50 may define a pocket 56 that is configured for operatively holding a portion of the biasing device 54 in a desired position. The biasing device 54 is configured to move the second handle portion 50 away from the first handle portion 48 such that the second base 32 and the second teeth 34 move relative to the corresponding first base 24 and first teeth 26. In the embodiment shown, when the second handle portion 50 moves away from the first handle portion 48, the fixture 10 moves from the open position 40 to the closed position 44. It should be appreciated, however, that the first and second handle portions 48, 50 and the first and second teeth 26, 34 may alternately be configured such that when the second handle portion 50 moves away from the first handle portion 48, the fixture 10 moves from the closed position 44 to the open position 40.

To assist in guiding the teeth 26, 34 around the terminals 12, each of the first and second teeth 26, 34 may extend to respective tips 58 that are generally tapered. Tapering each of the teeth 26, 34 provides a lead-in 60 that is configured for guiding the teeth 26, 34 around the respective terminals 12 to prevent bending or otherwise damaging the terminals 12.

A support frame 62 may be operatively attached to the first side member 20. More specifically, the support frame 62 may be attached to the first base 24 of the first side member 20. However, the support frame 62 may alternatively be attached to the second side member 22 as desired. At least one indexing feature 64 may extend from the support frame 62. Referring to FIG. 1, two indexing features 64 extend from the support frame 62. Each of the indexing features 64 presents a face 66 that is configured for locating the fixture 10 relative to the battery 14 when inserting the terminals 12 between the slits 42 of the fixture 10. The indexing features 64 limit movement of the fixture 10 toward the battery 14 to ensure that the terminals 12 do not get damaged by the teeth 26, 34.

While the best modes for carrying out the invention have been described in detail, those familiar with the art to which this invention relates will recognize various alternative designs and embodiments for practicing the invention within the scope of the appended claims.

The invention claimed is:

1. A battery terminal holder fixture for holding terminals of a battery in alignment, said fixture comprising:
   a first side member having a plurality of first teeth extending in spaced and generally parallel relationship to one another; and
   a second side member having a plurality of second teeth extending in spaced and generally parallel relationship to one another;
   wherein said second side member is configured to move relative to said first side member between an open position and a closed position;
   wherein said second side member opposes said first side member such that a number of said plurality of first teeth oppose a corresponding number of said plurality of second teeth and a slit is defined between each of said adjacent teeth when said fixture is in said open position;
   wherein said second side member opposes said first side member such that said number of said plurality of first teeth are staggered relative to said corresponding number of said plurality of second teeth to reduce said slit in size and capture the terminals of the battery therebetween when said fixture is in said closed position;

wherein said first side member further includes a first base and said plurality of first teeth extend from said first base in spaced and generally parallel relationship to one another;

wherein said second side member further includes a second base and said plurality of second teeth extend from said second base in spaced and generally parallel relationship to one another;

wherein said second base opposes, and is configured to move relative to, said first base;

a handle extending from said first base and said second base;

wherein said handle includes a first handle portion extending generally perpendicularly from said first base and a second handle portion extending generally perpendicularly from said second base;

wherein said first handle portion defines a cross-section that is generally C-shaped and defines a cavity configured for receiving a portion of said second handle portion as said second handle portion moves relative to said first handle portion;

wherein each of said first handle portion and said second handle portion are configured to be grasped by one hand of a user;

wherein said second handle portion is configured to move relative to said first handle portion to cause said second base and said plurality of second teeth to move relative to said first base and said plurality of first teeth; and wherein a biasing device disposed to react between said first handle portion and said second handle portion to bias said second handle portion away from said first handle portion.

2. The battery terminal holder fixture, as set forth in claim 1, wherein said plurality of first teeth equals said plurality of second teeth.

3. The battery terminal holder fixture, as set forth in claim 2, wherein said plurality of first teeth are offset from said plurality of second teeth when said fixture is in said open position.

4. The battery terminal holder fixture, as set forth in claim 3, wherein said plurality of first teeth include a plurality of intermediate first teeth disposed between a pair of first end teeth and said plurality of second teeth include a plurality of intermediate second teeth disposed between a pair of second end teeth.

5. The battery terminal holder fixture, as set forth in claim 4, wherein one of said first end teeth does not oppose any of said plurality of second teeth while the other of said first end teeth opposes one of said second intermediate teeth when said fixture is in said open position.

6. The battery terminal holder fixture, as set forth in claim 5, wherein one of said second end teeth does not oppose any of said second end teeth while the other of said second end teeth opposes one of said first intermediate teeth when said fixture is in said open position.

7. The battery terminal holder fixture, as set forth in claim 1, wherein said second handle portion defines a pocket and a portion of said biasing device is operatively disposed in said pocket.

8. The battery terminal holder fixture, as set forth in claim 1, wherein said biasing member is a coil spring.

9. The battery terminal holder fixture, as set forth in claim 1, further comprising a support frame operatively attached to said first base of said first side member;

wherein at least one indexing feature extends from said first side member; and wherein said at least one indexing feature presents a face that is configured for locating said fixture relative to the battery when inserting the terminals between said slits in said fixture to limit movement of the fixture toward the battery.

10. The battery terminal holder fixture, as set forth in claim 1, wherein a portion of each of said plurality of first and second teeth taper and extend to respective tips to guide said plurality of first and second teeth around the respective terminals.

11. A battery terminal holder fixture for holding terminals of a battery in alignment, said fixture comprising:

a first side member having a plurality of first teeth extending in spaced and generally parallel relationship to one another;

a second side member having a plurality of second teeth extending in spaced and generally parallel relationship to one another;

a first handle portion extending generally perpendicularly from said first side member and a second handle portion extending generally perpendicularly from said second side portion;

wherein said first handle portion defines a cross-section that is generally C-shaped and defines a cavity configured for receiving a portion of said second handle portion as said second handle portion moves relative to said first handle portion;

wherein each of said first handle portion and said second handle portion are configured to be grasped by one hand of a user;

wherein said second handle portion is configured to move relative to said first handle portion to cause said second side member to move relative to said first side member between an open position and a closed position;

wherein a biasing device disposed to react between said first handle portion and said second handle portion to bias said second handle portion away from said first handle portion;

wherein said second side member opposes said first side member such that a number of said plurality of first teeth oppose a corresponding number of said plurality of second teeth and a slit is defined between each of said adjacent teeth when said fixture is in said open position;

wherein said second side member opposes said first side member such that said number of said plurality of first teeth are staggered relative to said corresponding number of said plurality of second teeth to reduce said slit in size and capture the terminals of the battery therebetween when said fixture is in said closed position.

12. A battery terminal holder fixture for holding terminals of a battery in alignment, said fixture comprising:

a first side member having a plurality of first teeth extending in spaced and generally parallel relationship to one another;

a second side member having a plurality of second teeth extending in spaced and generally parallel relationship to one another;

a first handle portion extending generally perpendicularly from said first side member and a second handle portion extending generally perpendicularly from said second side portion;

wherein said first handle portion defines a cross-section that is generally C-shaped and defines a cavity configured for receiving a portion of said second handle portion as said second handle portion moves relative to said first handle portion;

wherein each of said first handle portion and said second handle portion are configured to be grasped by one hand of a user;

wherein a biasing device disposed to react between said first handle portion and said second handle portion to bias said second handle portion away from said first handle portion;

wherein said second handle portion is configured to move relative to said first handle portion to cause said second side member with said plurality of second teeth to move relative to said first side member and said plurality of first teeth from an open position to a closed position;

wherein a slit is defined between each of said first teeth and each of said adjacent second teeth when said fixture is in said open position; and wherein said slit is reduced when said fixture is in said closed position.

* * * * *